United States Patent [19]

Sakurai et al.

[11] 4,330,647
[45] May 18, 1982

[54] PROCESS FOR POLYMERIZING α-OLEFINS

[75] Inventors: Hisaya Sakurai; Yoshihiko Katayama; Tadashi Ikegami; Masayasu Furusato, all of Kurashiki, Japan

[73] Assignee: Asahi Kasei Kogyo Kabushiki Kaisha, Osaka, Japan

[21] Appl. No.: 177,547

[22] Filed: Aug. 13, 1980

[30] Foreign Application Priority Data

Sep. 28, 1979 [JP] Japan .................. 54-124912
Jul. 4, 1980 [JP] Japan .................. 55-090720

[51] Int. Cl.³ .................. C08F 4/02; C08F 10/00
[52] U.S. Cl. .................. 526/116; 252/429 B; 252/429 C; 526/125; 526/127; 526/132; 526/139; 526/140; 526/141; 526/142; 526/143; 526/144; 526/348.2; 526/348.4; 526/348.5; 526/348.6; 526/352; 526/65
[58] Field of Search .................. 252/429 B, 429 C; 526/132, 125, 139–143, 144, 151, 152, 127, 116

[56] References Cited

U.S. PATENT DOCUMENTS

4,115,319 9/1978 Scata et al. .................. 526/140
4,159,965 7/1979 Sakurai et al. .................. 526/128
4,198,315 4/1980 Birkulbach et al. .................. 526/115

FOREIGN PATENT DOCUMENTS

1500873 2/1978 United Kingdom .................. 526/137

*Primary Examiner*—Edward J. Smith
*Attorney, Agent, or Firm*—Sprung, Horn, Kramer & Woods

[57] ABSTRACT

A process for polymerizing an α-olefin comprising contacting the olefin in liquid phase at a temperature of about 120° to 320° C. with a catalyst comprising a component (A) and an organometal component (B), the component (A) being produced by reacting a hydrocarbon-soluble organomagnesium component (i) of the formula, $$M_\alpha MgR_p^1 R_q^2 X_r^1 X_s^2 D_t$$

α, p, q, r, s and t each independently is 0 or a number greater than 0,
$p+q+r+s = m\alpha + 2$
$0 \leq (r+s)/(\alpha+1) < 2$,
m is the valence of M, M is a metal of the 1st to 3rd groups of the Periodic Table,
$R^1$ is a hydrocarbon group having 1 to 20 carbon atoms, $R^2$ is a secondary or tertiary alkyl group having 3 to 20 carbon atoms,
$X^1$ and $X^2$ each independently is a hydrogen atom or an organic electronegative group containing O, N or S,
D is an electron donor,
with a compound (ii) of the formula, $$R_a^3 C Y_{4-a}$$

wherein
$R^3$ is a hydrogen atom or a hydrocarbon group having 1 to 10 carbon atoms,
Y is a halogen atom,
a is 0 or 1, and contacting the product of (i)+(ii) with (iii) a compound of titanium and/or a compound of vanadium at a concentration of titanium plus vanadium of at most about 2 mols per liter of the inert reaction solvent, the atomic ratio of Mg/(Ti+V) in (A) being about 3 to about 500.

41 Claims, No Drawings

PROCESS FOR POLYMERIZING α-OLEFINS

BACKGROUND OF THE INVENTION

1. Field of the Invention

This invention relates to a process for polymerizing an α-olefin in liquid phase using a novel catalyst.

2. Description of the Prior Art

It is known that solution polymerization is suitable for the production of polyethylene and its advantages are as follows;

(1) The polymerization of ethylene is an exothermic reaction and removal of heat is a big problem from the viewpoint of a process. Since the efficiency of removing heat increases with greater differences between the inner temperature of a reactor and that of a cooling jacket, solution polymerization in which a high polymerization temperature is employed is advantageous from this point.

(2) The degree of polymerization of ethylene, i.e. the molecular weight of polyethylene can be controlled comparatively accurately by varying the polymerization temperature and furthermore, the control of the molecular weight of polyethylene can be done by using a small amount of hydrogen.

3) Since the molecular weight of polyethylene is correlated with the viscosity of the reaction solution, it can be estimated by measurement of the viscosity of the reaction solution in the reactor and the control of the molecular weight of polyethylene can be quickly done accordingly.

(4) Polethylene is used or sold usually in the form of pellets. The polyethylene obtained by suspension polymerization and gas phase polymerization is powdery and it is necessary to melt-mold the powdery polyethylene into pellets by an extruder. On the other hand, according to solution polymerization it is possible to remove the polymerization solvent by evaporation with the use of the heat of polymerization and to introduce the polyethylene in its melt form into an extruder. As a result, excess step and heat for melting the polyethylene can be omitted. In order to make the most of this advantage, it is preferred that the polymerization temperature is high.

The disadvantage of solution polymerization is an increase in the solution viscosity due to the increase in the solution concentration or the molecular weight of polyethylene, which renders commercial scale production of polyethylene difficult. In order to avoid this disadvantage, it is necessary that the polymerization temperature is raised and simultaneously the solution viscosity is reduced. However, with increased polymerization temperatures the catalyst efficiency is decreased and a large amount of catalyst residue remains in the formed polyethylene and causes discoloration of the polyethylene and deterioration of molded articles obtained therefrom. Further, removal of the catalyst residue is difficult. Thus, there are required catalysts having a high catalyst efficiency at high temperatures which enable complete omission of the catalyst removal step due to the small amount of the catalyst residue present in the formed polyethylene.

There are known many Ziegler type catalysts having a high catalyst efficiency for suspension polymerization (see, e.g. U.S. Pat. Nos. 4,115,319, 4,159,965 and 4,163,831). However, the catalyst efficiency of these catalysts is, in general, decreased with increased polymerization temperatures, and especially at temperatures higher than about 150° C., the decrease in the catalyst efficiency is remarkable. Thus the performances of such catalysts are not enough to omit the removal step of catalyst residue when employed in solution polymerization.

There are also known catalysts for solution polymerization of an olefin which comprise an organomagnesium complex, an aluminum halide, hydrogen chloride, a halogenated secondary or tertiary alkyl or halogenated silicon compound and a titanium compound (see, e.g. U.S. Pat. Nos. 4,159,965 and 4,172,050 and U.K. Pat. Nos. 1,251,177 and 1,235,062). These catalysts have a higher catalyst efficiency than the conventional catalysts but their catalyst efficiency at high temperatures is still insufficient.

As a result of the study on the catalyst system for solution polymerization it has been discovered that by using, as a catalyst, a component having been obtained by reacting a specific organomagnesium compound with a halogenated compound and contacting the obtained product with a titanium compound and/or a vanadium compound, in combination with an organometal component, there can be obtained catalysts having a very high catalyst efficiency without any decrease at least at 150° C., especially at least at 180° C., and an excellent storage stability suitable for the polymerization of an olefin.

SUMMARY OF THE INVENTION

According to this invention there is provided a process for polymerizing an α-olefin comprising contacting the olefin in liquid phase at a temperature of about 120° to about 320° C. with a catalyst comprising a component (A) and an organometal component (B), the component (A) being produced by reacting a hydrocarbon-soluble organomagnesium component (i) of the formula,

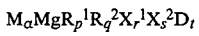

wherein

α, p, q, r, s and t each independently is 0 or a number greater than 0, p+q+r+s=mα+2, 0≦(r+s)/(α+1)<2, m is the valence of M, M is a metal of the 1st to 3rd groups of the Periodic Table, $R^1$ is a hydrocarbon group having 1 to 20 carbon atoms, $R^2$ is a secondary or tertiary alkyl group having 3 to 20 carbon atoms, $X^1$ and $X^2$ each independently is a hydrogen atom or an organic electronegative group containing O, N or S, D is an electron donor, with a compound (ii) of the formula,

wherein $R^3$ is a hydrogen atom or hydrocarbon group having 1 to 10 carbon atoms, Y is a halogen atom, a is 0 or 1, and contacting the product of (i)+(ii) with (iii) a compound of titanium and/or a compound of vanadium at a concentration of titanium plus vanadium of at most about 2 mols per liter of the inert reaction solvent, the atomic ratio of Mg/Ti+V) in (A) being about 3 to about 500.

One of the characteristic features of this invention is a high catalyst efficiency which reaches at least 500 Kg/g(Ti+V) as will be illustrated by the Examples. ACcordingly, the step re removing catalyst residue can be omitted.

Another characteristic feature of this invention is that the catalyst of this invention is stable at high temperatures and the catalyst efficiency reaches 500 Kg/g(Ti+V) at a temperature of 180° C. or higher than 180° C.

Still another characteristic feature of this invention is that there can be obtained polymers having a narrow molecular weight distribution, a high molecular weight and a high rigidity suitable for injection molding.

A further characteristic feature of this invention is that there can be also obtained polymers having a broad molecular weight distribution suitable for extrusion molding by multistage polymerization having a plurality of polymerization zones where the polymerization conditions such as the temperature and the concentration of hydrogen as the temperature and the concentration of hydrogen are varied.

DETAILED DESCRIPTION OF THE INVENTION

The organomagnesium component (i) which can be used in preparing the catalyst component (A) is a complex of an organomagnesium compound represented by the formula,

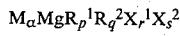

$$M_\alpha MgR_p^1 R_q^2 X_r^1 X_s^2$$

wherein

M, $R^1$, $R^2$, $X^1$, $X^2$, $\alpha$, p, q, r and s are the same as defined above,
with an electron donor represented by D, and the organomagnesium compound includes dihydrocarbyl magnesium $R_2Mg$ wherein R is a hydrocarbon group and complexes of dihydrocarbyl magnesium with other organometal compounds.

In this formula, $R^1$ is a hydrocarbon group having 1 to 20 carbon atoms. Exemplary hydrocarbon groups include alkyl groups such as methyl, ethyl, propyl, butyl, amyl, hexyl and decyl groups; cycloalkyl groups such as cyclohexyl group; aryl groups such as phenyl group; and aralkyl groups such as benzyl group. Of these groups, alkyl groups are preferred. $R^2$ is a secondary or tertiary alkyl group having 3 to 20 carbon atoms, and lower alkyl groups are preferred. Exemplary alkyl groups include isopropyl, sec-butyl, tert-butyl, sec-amyl, tert-amyl, sec-hexyl and sec-octyl groups. In this invention, these secondary or tertiary alkyl groups are very important, and the advantageous effects of this invention can be brought about only by using the organomagnesium component (i) having such alkyl groups.

M is a metal of the 1st to 3rd groups of the Periodic Table. Examplary metals represented by M include lithium, sodium, potassium, beryllium, calcium, strontium, barium, zinc, boron and aluminum. Of these metals, lithium, beryllium, boron, aluminum and zinc are preferred due to their ease in making hydrocarbon-soluble organomagnesium complexes. A more preferred metal is aluminum. The atomic ratio of M to Mg, i.e., $\alpha$ may be widely varied including zero but it is preferred to employ hydrocarbon-soluble organomagnesium complexes in which $\alpha$ is 0 to 1.5. It is more preferred to employ the organomagnesium compound in which $\alpha$ is 0 to 1.

In general, organomagnesium compounds are insoluble in an inert hydrocarbon medium but those with $\alpha > 0$ are soluble in an inert hydrocarbon medium. In this invention it is essential that the organomagnesium compounds are soluble in an inert hydrocarbon medium. Also organomagnesium compounds with $\alpha = 0$ such as (sec—$C_4H_9)_2Mg$, (tert—$C_4H_9)_2Mg$, (iso—$C_3H_7)Mg(n$—$C_4H_9)$ and (sec—$C_4H_9)Mg$-(n—$C_4H_9$) which are soluble in an inert hydrocarbon can be used in this invention with good results.

$X^1$ and $X^2$ in the organomagnesium component (i) each independently is a hydrogen atom or an organic electronegative group containing O, N or S. Exemplary organic electronegative groups include $OR^4$, $OSiR^5R^6R^7$, $NR^8R^9$, $SR^{10}$ and

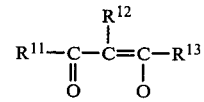

ps wherein $R^4$, $R^{10}$, $R^{11}$ and $R^{13}$ each independently is a hydrocarbon group having 1 to 20 carbon atoms and $R^5$, $R^6$, $R^7$, $R^8$, $R^9$ and $R^{12}$ each independently is a hydrogen atom or a hydrcarbon group having 1 to 20 carbon atoms. Exemplary hydrocarbon groups include alkyl groups such as methyl, ethyl, propyl, butyl, amyl, hexyl and decyl groups; cycloalkyl groups such as cyclohexyl group; aryl groups such as phenyl group; and aralkyl groups such as benzyl group. Of these organic electronegative groups, $OR^4$ and $OSiR^5R^6R^7$ are preferred.

$\alpha$, p, 1, r and s each independently is 0 or a number greater than 0 and the relationship of $p+q+r+s=m\alpha+2$ wherein m is the valence of M is satisfied. This relationship shows stoichiometry between the valence of M plus Mg and the substitutents. The range of $0 \leq (r+s)/(\alpha+1) < 2$ designates that a total number of $X^1$ and $X^2$ per total number of M and Mg is 0 to 2. It is preferred to employ the organomagnesium compounds containing $X^1$ and $X^2$. A preferred range is $0 < (r+s)/(\alpha+1) < 1.5$, especially $0.1 \leq (r+s)/(\alpha+1) \leq 1.3$ in obtaining a high catalyst efficiency at high temperatures.

The organomagnesium compounds can be prepared by reacting a compound of $R^1MgQ$ or $R_2^1Mg$ wherein $R^1$ is the same as defined above and Q is a halogen atom, with an organometal compound of $MR_m^2$, $Mr_a^2X_b^1X_c^2$ or $MQ_aX_b^1X_c^2$ wherein M, $R^2$, $X^1$, $X^2$, Q and m are the same as defined above and $a+b+c=m$, in an inert hydrocarbon medium such as hexane, heptane, octane, cyclohexane, benzene and toluene at a temperature of about 0° C. to about 150° C., and, if necessary or if desired, further reacting the resulting reaction product with an alcohol, siloxane, amine, imine, thiol or a dithio compound. Furthermore, the organomagnesium compound can be prepared by reacting a compound of $MgX_2^1$ or $R^1MgX^1$ with a compound of $MR_m^2$ or $MR_{m-1}^2H$ or by reacting a compound of $R^1MgX^1$ or $R_2^1Mg$ with a compound of $R_n^2MX_{m-n}^2$ or $X_a^1MX_{m-a}^2$ wherein M, $R^1$, $R^2$, $X^1$, $X^2$ and m are the same as defined above and a and n each independently is a number of 0 to m.

The electron donor represented by D is an electron donative organic compound containing O, N, S or P. Examplary electron donors used in this invention include ethers such as diethyl ether, dibutyl ether, diisoamyl ether, ethylene glycol dimethyl ether, diethylene glycol dimethyl ether, glycerol trimethyl ether, vinyl methyl ether, tetrahydrofuran, dioxane, crown ether and propylene oxide; siloxanes such as hexamethyldisoloxane, sym-dihydrotetramethyldisiloxane, pentamethyltrihydrotrisiloxane, methylhydrocyclotetrasiloxane, methylhydropolysiloxane, dimethylpolysiloxane and phenylhydropolysiloxane; tertiary amines such as triethylamine, tributylamine, tetramethylethylenediamine, bis(diethylamino)methane, and diazabicyclooctane; nitriles such as acetonitrile, propionitrile, acrylonitrile, benzylnitrile and benzonitrile; amides such as dimethylformamide and hexamethylphosphoric triamide; pyridines such as pyridine and methylpyridine; thioethers such as diethyl sulfide, ethylpropyl sulfide, dipropyl sulfide and ethylene sulfide; sulfoxides such as dimethyl sulfoxide, diethyl sulfoxide and dibutyl sulfoxide; phosphines such as triethylphosphine and triphenylphosphine and esters such as ethyl benzoate and ethyl acetate. Of these compounds, ethers, siloxanes and amines are preferred. More preferred are siloxanes.

The suffix t designates the amount of electron donor coordinated with M or Mg and represents zero or a number greater than zero. In order to obtain a high catalyst efficiency at high temperatures, it is important that the electron donor is coordinated with M or Mg. A preferred t ranges from about 0.05 to about 10, and a more preferred t ranges from about 0.2 to about 2.

The complex of the organomagnesium compound with the electron donor can be easily prepared by contacting the organomagnesium compound with the electron donor at a temperature of about $-20°$ C. to about 100° C. in such an inert hydrocarbon medium as employed in the preparation of the organomagnesium compound.

In the compound (ii) of formula $R_a{}^3CY_{4-1}$, $R^3$ is a hydrogen atom, a hydrocarbon group having 1 to 10 carbon atoms such as an alkyl group including methyl, ethyl, propyl, butyl and amyl groups, a halogenated alkyl group such as trichloromethyl group or an aryl group such as phenyl group. Y is a chlorine, bromine, iodine or fluorine atom. Of these halogen atoms, a chlorine atom is preferred. Exemplary compounds (ii) include carbon tetrahalides, carbon monohydrohalides and carbon monohydrocarbylhalides such as carbon tetrachloride, chloroform, 1,1,1-trichloroethane, 1,1,1-trichloropropane, phenyltrichloromethane and hexachloroethane.

The compounds (iii) of titanium and the compounds (iii) of vanadium which can be employed include halides, oxyhalides, alkoxyhalides, alkoxides and oxyalkoxides of titanium or vanadium such as titanium tetrachloride, titanium tetrabromide, titanium tetraiodide, ethoxytitanium trichloride, propoxytitanium trichloride, butoxytitanium trichloride, dipropoxytitanium dichloride, dibutoxytitanium dichloride, tripropoxytitanium monochloride, tributoxytitanium monochloride, tetrapropoxytitanium, tetrabutoxytitanium, vanadium tetrachloride, vanadyl trichloride, monobutoxyvanadyl dichloride, dibutoxyvanadyl monochloride, tributoxyvanadyl and, ethoxytrichlorovanadium and any mixture thereof. It is preferred to employ compounds of titanium and compounds of vanadium which have at least one halogen atom such as chlorine atom.

The reaction of the hydrocarbon-soluble organomagnesium component (i), the compound (ii) and the compound (iii) can be conducted in an inert reaction medium or solvent. Exemplary inert reaction solvents employed in this invention include aliphatic hydrocarbons such as hexane, heptane and octane; aromatic hydrocarbons such as benzene and toluene; alicyclic hydrocarbons such as cyclohexane and cyclomethylhexane; and any mixtures thereof. It is preferred from the viewpoint of the catalyst performances that aliphatic hydrocarbons are employed. With the order of the reaction of these components (i), (ii) and (iii), previous contact of the component (i) with the compound (iii) should be avoided in order for the catalyst to exhibit its high activity. More specifically, the surprising effect of this invention can be accomplished by firstly reacting the component (i) with the compound (ii) to form a solid product and secondly contacting the compound (iii) with the surface of the solid product effectively.

The reaction between the component (i) and the compound (ii) may be carried out by adding these two components into a reaction zone at the same time or by firstly charging one of them into the reaction zone and secondly adding the other into the reaction zone. The reaction temperature was not particularly limited and typically ranges from about $-50°$ C. to about 150° C. A preferred reaction temperature ranges from about 0° C. to about 100° C. from the viewpoint of the progress of reaction. The mol ratio of the compound (ii) to the component (i) which can be employed in this invention is not particularly limited and typically ranges from about 0.01 to about 100. A preferred mol ratio of the halide (ii) to the component (i) ranges from about 0.1 to about 20. The solid product obtained by the reaction between the component (i) and the compound (ii) may be usually separated by filtration or washed by decantation and then supplied to the contact with the compound (iii). In order to simplify the reaction procedure, it is preferred that the compound (iii) is added to the reaction solution obtained after completion of the reaction between the component (i) and the compound (ii), and further the contact with the compound (iii) is continued.

In order to impart a high catalyst activity at high temperatures to the catalyst, it is essential to control the amount of the compound (iii) employed and the concentration of the compound (iii) in the reaction solution. The atomic ratio of Mg/(Ti+V) which is used in this invention ranges from about 3 to about 500, and a preferred atomic ratio of Mg/(Ti+V) ranges from about 5 to about 200. A more preferred atomic ratio of Mg/(Ti+V) ranges from about 10 to about 100. The concentration of Ti plus V in the reaction solution used in this invention is at most 2 mols per liter of the inert reaction solvent. A preferred concentration of Ti plus V in the reaction solution ranges from about 0.01 to about 100 mmols per liter of the inert reaction solvent. The temperature for contacting the solid product formed by the reaction between the component (i) and the compound (ii) with the compound (iii) is not particularly limited and typically ranges from about $-50°$ C. to about 150° C., preferably from about 0° C. to about 95° C.

The component (A) of this invention becomes an excellent catalyst for polymerizing an olefin in combination of an organometal component (B).

Exemplary organometal components (B) which can be used in this invention are organoaluminum compound including trialkyaluminums such as Al(C$_2$H$_5$)$_3$, Al(C$_3$H$_7$)$_3$, Al(C$_4$H$_9$)$_3$, Al(C$_5$H$_{11}$)$_3$, Al(C$_6$H$_{13}$)$_3$, Al(C$_8$H$_{17}$)$_3$ and Al(C$_{10}$H$_{21}$)$_3$, alkylaluminum halides such as Al(C$_2$H$_5$)$_2$Cl, Al(C$_2$H$_5$)Cl$_2$, Al(i—C$_4$H$_9$)$_2$Cl and Al(C$_2$H$_5$)$_2$Br, alkylaluminum alkoxides such as Al(C$_2$H$_5$)$_2$ (OC$_2$H$_5$) and Al(i—C$_4$H$_9$)$_2$(OC$_4$H$_9$), alkylaluminum siloxides such as Al(C$_2$H$_5$)$_2$ (OSiH.CH$_3$.C$_2$H$_5$) and Al(i—C$_4$H$_9$)[OSi(CH$_3$)$_2$(i-—C$_4$H$_9$)]$_2$, reaction products of a trialkylaluminum and a conjugated diene such as aluminum isoprenyl and aluminum myrcenyl; organoboron compounds such as trialkylborons such as B(C$_2$H$_5$)$_3$, B(C$_3$H$_7$)$_3$, B(C$_4$H$_9$)$_3$, B(C$_6$H$_{13}$)$_3$ and B(C$_8$H$_{17}$)$_3$, triarylborons such as B(C$_6$H$_5$)$_3$, alkylboron alkoxides such as B(C$_5$H$_{11}$)$_2$(OC$_4$H$_9$) and alkylboron halides such as B(C$_7$H$_{15}$)$_2$Cl; organozinc compounds such as dialkylzincs including Zn(C$_2$H$_5$)$_2$, Zn(C$_4$H$_9$)$_2$, Zn(C$_6$H$_{13}$)$_2$, Zn(C$_8$$_{17}$)$_2$ and Zn(C$_2$H$_5$)(n—C$_3$H$_7$), diarylzincs such as Zn(C$_6$H$_5$)$_2$ and alkylzinc alkoxides such as Zn(C$_3$H$_7$)(OC$_4$H$_9$); organomagnesium compounds of the formula,

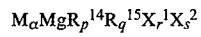

$$M_\alpha MgR_p^{14} R_q^{15} X_r^1 X_s^2$$

wherein

R$^{14}$ and R$^{15}$ each independently is a hydrocarbon group having 1 to 20 carbon atoms, M, X$^1$, X$^2$, a, p, q, r and s are the same as defined above, which include the same organomagnesium compounds as described above; and any mixtures thereof. Of these organometal compounds, organoaluminum compounds are preferred, and trialkylaluminum are more preferred.

The component (A) and the organometal component (B) may be added under the polymerization conditions to the polymerization system or may be combined prior to the polymerization.

The mol ratio of the organometal component (B) to (Ti+V) in the component (A) typically ranges from about 3 to about 1,000 and preferably ranges from about 5 to about 500.

The catalyst of this invention is suitable for the polymerization of ethylene and may also be employed for the copolymerization of ethylene with another α-olefin having 3 to 20 carbon atoms such as propylene, butene-1, isobutene, hexene-1, 4-methylpentene-1, octene-1 and or with a polyene such as butadiene and isoprene. In the copolymerization it is preferred to employ the mol ratio of the α-olefin to be copolymerized to ethylene of at most 5. According to this invention it is possible to produce polyethylene having a density of about 0.975 to about 0.910 by the homo- or co-polymerization of ethylene.

In this invention, polymerization is conducted at a temperature ranging from about 120° C. to about 320° C., preferably from about 150° C. to about 300° C. by the solution polymerization method. As the polymerization medium or solvent there can be employed aliphatic hydrocarbons such as hexane, heptane or octane; aromatic hydrocarbon such as benzene, toluene or xylene; and alicyclic hydrocarbons such as cyclohexane or methylcyclohexane. The catalyst is introduced into a reactor together with the polymerization solvent and ethylene is added at a pressure of ethylene of from about 0.1 to about 40 MPa, preferably from about 1 to about 25 MPa in an inert atmosphere and polymerized. Also it is possible to employ such a means as a stirrer for providing better contact between ethylene and the catalyst in the polymerization.

In this invention there may be employed single stage polymerization having one polymerization zone or multistage polymerization having a plurality of polymerization zones. The catalyst of this invention can provide polyethylene having a narrow molecular weight distribution in the single stage polymerization and polyethylene having a broad molecular weight distribution in the multistage polymerization.

In order to control the molecular weight of the polymer, the temperature of the reactor may be varied or it is also possible to add hydrogen or an organic compound which can easily cause chain transfer. Furthermore, the process of this invention may be combined with a method of using a titanate as a third component for controlling the density of the polymer formed.

The present invention will now be illustrated in greater detail with reference to several Examples, but they are given for illustrative purposes only and are not to be construed as limiting the invention.

In these examples MI designates a melt index of a polymer which is measured at 190° C. under a load of 2.16 Kg in accordance with ASTM D-1238. FR designates a flow ratio represented by MI$_{21.6}$/MI$_{2.16}$ wherein MI$_{21.6}$ is a melt index of the polymer measured at 190° C. under a load of 21.6 Kg and MI$_{2.16}$ is the melt index measured at 190° C. under a load of 2.16 Kg and is one of the criteria for the molecular weight distribution. A lower FR shows a narrower molecular weight distribution. The term "catalyst efficiency" shows the amount of polymer formed in kilogram per gram of Ti plus V.

EXAMPLE 1

(I) Synthesis of Component (A)

The oxygen and moisture present inside a 250 ml flask equipped with a dropping funnel and a water-cooled reflux condenser were purged with nitrogen, and to the flask were charged 20 ml of a heptane solution containing chloroform in an amount of 0.1 mol per liter of heptane and 30 ml of heptane in a nitrogen atmosphere and the temperature was raised to 70° C. Then 20 ml of a heptane solution containing 2.1 ml of Al$_{0.1}$Mg-(n—C$_4$H$_9$)$_{1.0}$(sec—C$_4$H$_9$)$_{1.0}$(On—C$_4$H$_9$)$_{0.3}$ were accurately measured, charged in the dropping funnel and added drop-wise to the flask at 70° C. with stirring over 2 hours, resulting in a white suspension reaction solution. To the obtained suspension reaction solution were added 20 ml of a heptane solution containing 5.7 mg of titanium tetrachloride at a concentration of titanium of 0.3 mmol per liter of heptane and the reaction was continued at 70° C. for two hours.

(II) Polymerization of Ethylene

In a 1l autoclave evacuated were charged 5 ml of the component (A) as obtained above and 0.02 mmol of trioctyl aluminum with 0.6l of dehydrated and deaerated octane, and then 10 mmols of hydrogen was introduced into the autoclave. While keeping the temperature of the autoclave at 190° C., ethylene was introduced into the autoclave at a pressure of 4.0 MPa and the polymerization was carried out for 20 minutes while maintaining the total pressure constant by supplying additional ethylene, resulting in 54 g of a polymer. The catalyst efficiency was 750 Kg/g Ti, MI was 6.9, FR was 24, the density was 0.967 g/cc.

EXAMPLES 2 to 11

Components (A) were prepared by reacting the hydrocarbon-soluble organomagnesium component (i) with the compound (ii) under the reaction conditions as set forth in Table 1 and subsequently contacting the obtained product with the compound (iii) under the reaction conditions as set forth in Table 1 in the same manner as described in Example 1. Using 5 ml of these components (A) and organometal compounds (B) as set forth in Table 2 under the reaction conditions as set forth in Table 2, polymerization of ethylene was carried out under the polymerization conditions as set forth in Table 2 in the same manner as in Example 1. The results are shown in Table 2.

EXAMPLES 12 to 18

(I) Synthesis of Component (A)

2 mmols of $Al_{0.2}Mg(C_2H_5)_{0.6}(n-C_4H_9)_2$ were mixed with a siloxane compound as set forth in Table 3 at 30° C. to form a hydrocarbon-soluble organomagnesium component (i). The component (A) was prepared in the same manner as in Example 1 except that the obtained component (i), the compound (ii), the compound (iii) and the reaction conditions as set forth in Table 3 were used.

(II) Polymerization of Ethylene

Using 2.5 ml of the obtained component (A), the organometal component (B) and the polymerization conditions as set forth in Table 4, polymerization of ethylene was conducted in the same manner as in Example 1. The results are shown in Table 4.

TABLE 1

| Example No. | Organomagnesium Component (i) (mmol) | Compound (ii) (mmol) | (i) + (ii) Reaction Conditions Temperature (°C.) | Time (hour) | Compound (iii) (mmol) | Concentration or Titanium plus Vanadium (mmol per liter of solvent) | [(i) + (ii)] + (iii) Reaction Conditions Temperature (°C.) | Time (hour) |
|---|---|---|---|---|---|---|---|---|
| 2 | $Li_{0.1}Mg(n-C_4H_9)_{0.6}(sec-C_4H_9)_{0.6}(On-C_6H_{13})_{0.9}$ 2.0 | $HCCl_3$ 20.0 | 70 | 2 | $TiCl_3(Oi-C_3H_7)$ + 0.100 $VOCl_3$ 0.050 | 1.5 | 90 | 2 |
| 3 | $Al_{0.4}Mg(n-C_6H_{13})_{1.3}(i-C_3H_7)_{0.5}[OSi(CH_3)_3]_{1.4}$ 2.0 | $CCl_4$ 30.0 | 50 | 2 | $TiCl_4$ + 0.120 $VO(On-C_4H_9)_3$ 0.120 | 2.4 | 80 | 3 |
| 4 | $Al_{0.2}Mg(C_2H_5)_{1.4}(sec-C_4H_9)_{0.9}(On-C_3H_7)_{0.3}$ 2.0 | $CH_3CCl_3$ 15.0 | 100 | 1 | $TiCl_4$ 0.138 | 1.38 | 20 | 6 |
| 5 | $ZnMg(C_2H_5)_{1.7}(sec-C_5H_{11})_{1.0}(SC_2H_5)_{1.3}$ 2.0 | $C_6H_5CCl_3$ 50.0 | 0 | 10 | $TiCl_3(Oi-C_3H_7)$ 0.0051 | 0.051 | 70 | 1 |
| 6 | $BMg(n-C_4H_9)_{3.3}(sec-C_6H_{13})_{1.2}[N(CH_3)_2]_{0.5}$ 2.0 | $n-C_8H_{17}CCl_3$ 80.0 | −10 | 15 | $TiCl_2(On-C_4H_9)_2$ 0.165 | 1.65 | 100 | 1 |
| 7 | $Mg(n-C_4H_9)(sec-C_4H_9)$ 2.0 | $Cl_3CCCl_3$ 0.3 | 60 | 3 | $VOCl_3$ 0.185 | 1.85 | 50 | 4 |
| 8 | $Al_{0.9}Mg(n-C_3H_7)(t-C_5H_{11})_{1.2}(On-C_4H_9)_{1.5}$ 2.0 | $C_2H_5CCl_3$ 1.0 | 20 | 6 | $TiCl_3(Oi-C_3H_7)$ + 0.002 $VOCl_3$ 0.005 | 0.07 | 80 | 1 |
| 9 | $Al_{0.17}Mg(C_2H_5)_{0.51}(n-C_4H_9)(sec-C_4H_9) \cdot [O(n-C_4H_9)_2]_{0.30}$ 2.0 | $HCCl_3$ 6.6 | 50 | 6 | $TiCl_4$ + 0.042 $VO(On-C_4H_9)_3$ 0.060 | 10.0 | 65 | 1 |
| 10 | $Al_{0.4}Mg(n-C_6H_{13})_{2.2}(i-C_3H_7)\{O[Si(CH_3)_2H]_2\}_{1.4}$ 2.0 | $HCCl_3$ 2.2 | 80 | 3 | $TiCl_4$ + 0.070 $VOCl_2(On-C_4H_9)$ 0.050 | 1.2 | 70 | 2 |
| 11 | $Al_{0.3}Mg(n-C_4H_9)_{1.8}(sec-C_4H_9)_{0.9}(On-C_4H_9)_{0.2} \cdot [N(CH_2)_3N]_{0.2}$ 2.0 | $CCl_4$ 4.0 | 80 | 3 | $TiCl_4$ 0.160 | 1.6 | 70 | 2 |

TABLE 2

| Example No. | Organometal Compound (B) | (mmol) | Polymerization Conditions Polymerization Temperature (°C.) | Ethylene Pressure (MPa) | $H_2$ (mmol) | Result of Polymerization Catalyst Efficiency [Kg/g(Ti + V)] | MI | FR |
|---|---|---|---|---|---|---|---|---|
| 2 | $Al(C_2H_5)_3$ | 0.05 | 180 | 3.0 | 15 | 516 | 5.4 | 25 |
| 3 | $Al(n-C_8H_{17})_3$ | 0.12 | 180 | 3.0 | 15 | 508 | 1.2 | 28 |
| 4 | $Al(i-C_4H_9)_3$ | 0.32 | 180 | 3.0 | 15 | 586 | 3.5 | 22 |
| 5 | $Al(C_2H_5)_{2.7}Cl_{0.3}$ | 5.21 | 180 | 3.0 | 15 | 416 | 12.5 | 26 |
| 6 | $Al(n-C_4H_9)_{2.4}(OC_2H_5)_{0.6}$ | 1.29 | 180 | 3.0 | 15 | 432 | 1.6 | 35 |
| 7 | Aluminum isoprenyl | 0.87 | 180 | 3.0 | 15 | 395 | 7.3 | 30 |
| 8 | $Al(C_2H_5)_3$ | 0.03 | 180 | 3.0 | 10 | 498 | 9.7 | 28 |
| 9 | $Al(C_2H_5)_3$ | 0.09 | 200 | 3.0 | 10 | 532 | 6.5 | .22 |
| 10 | $Al(C_2H_5)_3$ | 0.24 | 200 | 3.0 | 10 | 505 | 1.2 | 24 |
| 11 | $Al(n-C_6H_{13})_3$ | 0.36 | 200 | 3.0 | 10 | 574 | 8.5 | 19 |

TABLE 3

| Example No. | Electron Donor Siloxane Compound (mmol) | Compound (ii) (mmol) | Temperature (°C.) | Time (hour) | Compound (iii) (mmol) | Concentration of Titanium plus Vanadium (mmol per liter of solvent) | [(i) + (ii)] + (iii) Reaction Conditions Temperature (°C.) | Time (hour) |
|---|---|---|---|---|---|---|---|---|
| 12 | Dimethylpolysiloxane (viscosity: 20 centistokes) 2.0 | $CHCl_3$ 1.9 | 120 | 2 | $TiCl_4$ + $VCl_4$ 0.128   0.064 | 1.92 | 90 | 3 |
| 13 | Methylhydropolysiloxane (viscosity: 20 centistokes) 1.0 | $CHCl_3$ 4.0 | 80 | 2 | $TiCl_4$ 0.040 | 0.4 | 70 | 1 |
| 14 | Dihydrotetramethyldisiloxane 4.5 | $CCl_4$ 3.6 | 90 | 10 | $TiCl_4$ + $VOCl_3$ 0.035   0.035 | 0.7 | 60 | 3 |
| 15 | Dihydrotetramethyldisiloxane 4.5 | $CCl_4$ 3.6 | " | " | $TiCl_4$ + $VOCl_3$ 0.035   0.035 | " | " | " |
| 16 | Dihydrotetramethyldisiloxane 4.5 | $CCl_4$ 3.6 | " | " | $TiCl_4$ + $VOCl_3$ 0.035   0.035 | " | " | " |
| 17 | Dihydrotetramethyldisiloxane 4.5 | $CCl_4$ 3.6 | " | " | $TiCl_4$ + $VOCl_3$ 0.035   0.035 | " | " | " |
| 18 | Dihydrotetramethyldisiloxane 4.5 | $CCl_4$ 3.6 | " | " | $TiCl_4$ + $VOCl_3$ 0.035   0.035 | " | " | " |

TABLE 4

| Example No. | Organometal Compound (B) (mmol) | | Polymerization Conditions | | | Result of Polymerization | | |
|---|---|---|---|---|---|---|---|---|
| | | | Polymerization Temperature (°C.) | Ethylene Pressure (MPa) | $H_2$ (mmol) | Catalyst Efficiency Kg/g (Ti + V) | MI | FR |
| 12 | $Al(C_2H_5)_3$ | 0.061 | 190 | 2.5 | 30 | 703 | 6.4 | 22 |
| 13 | $Al(C_2H_5)_3$ | 0.120 | 160 | 3.0 | 15 | 502 | 2.5 | 26 |
| 14 | $Al(n-C_4H_9)_3$ | 0.225 | 180 | 3.0 | 20 | 511 | 3.6 | 28 |
| 15 | $B(C_2H_5)_{2.7}Cl_{0.3}$ | 0.359 | 160 | 3.0 | 30 | 385 | 10.2 | 23 |
| 16 | $Al_{0.8}Mg(C_2H_5)_{3.4}(sec-C_5H_{11})$ | 0.135 | 160 | 3.0 | 30 | 406 | 8.6 | 24 |
| 17 | $Zn(n-C_6H_{13})_2$ | 0.204 | 160 | 3.0 | 40 | 298 | 5.4 | 22 |
| 18 | $Li_{0.2}Mg(n-C_4H_9)_{1.2}(sec-C_4H_9)$ | 0.246 | 160 | 3.0 | 35 | 396 | 6.2 | 32 |

EXAMPLE 19

In the same manner as in Example 1, 1.0 mol of ethylene were polymerized at 140° C. at a pressure of ethylene of 4.0 MPa in the presence of 3 mmols of hydrogen by using 2.0 ml of the same component (A) as in Example 1 and 0.05 mmol of trioctyl aluminum. Then, after 80 mmols of hydrogen were introduced into the autoclave and its inner temperature was raised to 200° C., 1.2 mols of ethylene were further polymerized as a pressure of ethylene of 2.0 MPa, resulting in a polymer having a MI of 2.6 and a FR of 86.

EXAMPLE 20 to 24

A component (A) was prepared in the same manner as in Example 1 except that 2.0 mmols of $Al_{0.05}Mg(C_2H_5)_{1.05}(sec-C_4H_9)[O(n-C_4H_9)_2]_{0.3}$, 3.5 mmols of $HCCl_3$, 0.15 mmol to $TiCl_4$ and 0.05 mmol of $VOCl_3$ at a concentration of titanium plus vanadium of 2.0 mmols per liter of the reaction solvent were employed.

In a 1l autoclave evacuated were charged 4 ml of the obtained component (A) and 0.16 mmol of Al(i-—$C_4H_9)_3$ with 0.6l of dehydrated and deaerated methylcylohexane. After 10 mmols of hydrogen and an olefin as set forth in Table 5 were introduced into the autoclave, its inner temperature was raised to the one as set forth in Table 5 and then ethylene was added up to a pressure of 3.0 MPa. Until 1.5 mmols of ethylene was polymerized, copolymerization of ethylene was continued while maintaining the total pressure constant by supplying additional ethylene. The results are shown in Table 5.

TABLE 5

| Example No. | α-Olefin (mmol) | | Polymerization Temperature (°C.) | Products | | |
|---|---|---|---|---|---|---|
| | | | | MI | FR | Density (g/cc) |
| 20 | 4-Methylpentene-1 | 100 | 180 | 2.6 | 28 | 0.946 |
| 21 | Octene-1 | 200 | 180 | 8.6 | 22 | 0.943 |
| 22 | Butene-1 | 500 | 160 | 12.5 | 19 | 0.932 |
| 23 | 4,4-Dimethylpentene-1 | 400 | 160 | 3.6 | 25 | 0.930 |
| 24 | Hexene-1 | 1000 | 160 | 12.5 | 22 | 0.924 |

What is claimed is:

1. A process for polymerizing an α-olefin comprising contacting the olefin in liquid phase at a temperature of about 120° to 320° C. with a catalyst comprising a component (A) and an organometal component (B), the compenent (A) being produced by reacting a hydrocarbon-soluble organomagnesium component (i) of the formula,

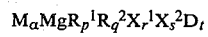

$$M_\alpha MgR_p^1 R_q^2 X_r^1 X_s^2 D_t$$

wherein

α, p, q, r, s and t each independently is 0 or a number greater than 0, $[0 < (r+s)/(\alpha+1) < 2, ]0 < (r+s)/(\alpha+1) < 1.5,$ m is the valence of M, M is a metal of the 1st to 3rd groups of the Periodic Table, $R^1$ is a hydrocarbon group having 1 to 20 carbon atoms, $R^2$ is a secondary or tertiary alkyl group having 3 to 20 carbon atoms, X¹ and X² each independently is a hydrogen atom or an organic electronegative group containing O, N or S, D is an electron donor, with a compound (ii) of the formula, $$R_a^3 CY_{4-a}$$

wherein

R³ is a hydrogen atom or a hydrocarbon group having 1 to 10 carbon atoms,

Y is a halogen atom, a is 0 or 1, and contacting the product of (i)+(ii) with (iii) a compound of tetravalent titanium and/or a compound of pentavalent or tetravalent vanadium at a concentration of titanium plus vanadium of at most about 2 mols per liter of an inert reaction solvent, the atomic ratio of Mg/(Ti+V) in (A) being about 3 to about 500.

2. A process of claim 1, wherein M in the organomagnesium component (i) of the component (A) is lithium, berylium, boron, aluminum or zinc metal.

3. A process of claim 2, wherein M in the organomagnesium component (i) of the component (A) is aluminum metal.

4. A process of claim 1, wherein $\alpha$ in the organomagnesium component (i) is $0 \leq \alpha \leq 1$.

5. A process of claim 4, wherein $\alpha$ in the organomagnesium component (i) is $0 < \alpha \leq 0.5$.

6. A process of claim 1, wherein X¹ and X² in the organomagnesium component (i) each independently is OR⁴, OSiR⁵R⁶R⁷, NR⁸R⁹, SR¹⁰ or

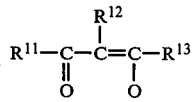

wherein R⁴, R¹⁰, R¹¹ and R¹³ each independently is a hydrocarbon group having 1 to 20 carbon atoms and R⁵, R⁶, R⁷, R⁸, R⁹ and R¹² each independently is a hydrogen atom or a hydrocarbon group having 1 to 20 carbon atoms.

7. A process of claim 6, wherein X¹ and X² in the organomagnesium component (i) each independently is OR⁴.

8. A process of claim 6, wherein X¹ and X² in the organomagnesium component (i) each independently is OSiR⁵R⁶R⁷.

9. A process of claim 1, wherein the polymerization temperature is about 180° C.

10. A process of claim 1, wherein the amount of X¹ and X² in the organomagnesium component (i) is $0.1 \leq (r+s)/(\alpha+1) \leq 1.3$.

11. A process of claim 1, wherein the electron donor represented by D is an electron donative organic compound containing O, N, S or P.

12. A process of claim 11, wherein the electron donative organic compound is an ether, a siloxane, a tertiary amine, a nitrile, an amide, a pyridine, a thioether, a sulfoxide or a phosphine.

13. A process of claim 12, wherein the electron donative organic compound is an ether.

14. A process of claim 12, wherein the electron donative organic compound is a siloxane.

15. A process of claim 12, wherein the electron donative organic compound is an amine.

16. A process of claim 1, wherein t in the organomagnesium component (i) is about 0.05 to about 10.

17. A process of claim 1, wherein t in the organomagnesium component (i) is about 0.2 to about 2.

18. A process of claim 1, wherein the compound (ii) is a carbon tetrahalide, a carbon monohydrohalide or a carbon monoalkylhalide.

19. A process of claim 18, wherein the carbon tetrahalide is carbon tetrachloride.

20. A process of claim 18, wherein the carbon monohydrohalide is chloroform.

21. A process of claim 1, wherein (iii) the compound of titanium and/or the compound of vanadium contains at least one chlorine atom.

22. A process of claim 1, wherein the reaction between the component (i) and the compound (ii) is conducted at a temperature of about −50° to about 150° C.

23. A process of claim 1, wherein the mol ratio of the compound (ii) to the component (i) is about 0.01 to about 100.

24. A process of claim 1, wherein the mol ratio of the compound (ii) to the component (i) is about 0.1 to about 20.

25. A process of claim 1, wherein the contact of the reaction product of (i)+(ii) with (iii) the compound of titanium and/or the compound of vanadium is conducted at a temperature of about −50° to about 150° C.

26. A process of claim 25, wherein the contact of the reaction product of (i)+(ii) with (iii) the compound of titanium and/or the compound of vanadium is conducted at a temperature of about 0° to about 95° C.

27. A process of claim 1, wherein the atomic ratio of Mg/(Ti+V) in the component (A) is about 5 to about 200.

28. A process of claim 27, wherein the atomic ratio of Mg/(Ti+V) in the component (A) is about 10 to about 100.

29. A process of claim 1, wherein the reaction product of the component (i) and the compound (ii) is contacted with (iii) the compound of titanium and/or the compound of vanadium at a concentration of titanium plus vanadium of about 0.01 mmol to about 100 mmols per liter of the inert reaction solvent.

30. A process of claim 1, wherein the organometal component (B) is an organoaluminum compound, an organoboron compound, an organozinc compound or an organomagnesium compound.

31. A process of claim 30, wherein the organometal component (B) is an organoaluminum compound.

32. A process of claim 31, wherein the organoaluminum compound is a trialkylaluminum, an alkylaluminum halide, an alkylaluminum alkoxide, an alkylaluminum siloxide and a reaction product of a trialkylaluminum and a conjugated diene.

33. A process of claim 1, wherein the mol ratio of the organometal compound (B) to (Ti+V) in the component (A) is about 3 to about 1000.

34. A process of claim 1, wherein the $\alpha$-olefin is ethylene.

35. A process of claim 34, wherein the polymerization of ethylene is carried out at a partial pressure of ethylene of about 1 to about 25 MPa at a polymerization temperature of about 150° to about 300° C.

36. A process of claim 1, wherein copolymerization of ethylene with an $\alpha$-olefin other than ethylene or a polyene.

37. A process of claim 36, wherein the $\alpha$-olefin other than ethylene is a $C_{3-20}$ $\alpha$-olefin.

38. A process of claim 36, wherein the polyene is butadiene or isoprene.

39. A process of claim 36, wherein the mol ratio of the α-olefin or polyene to ethylene is at most 5.

40. A process of claim 1, wherein the polymerization of an α-olefin is conducted in a plurality of polymerization zones.

41. A catalyst useful for polymerizing an α-olefin comprising a component (A) and an organometal component (B), the component (A) being produced by reacting a hydrocarbon-soluble organomagnesium component (i) of the formula, $$M_\alpha MgR^1_p R^2_q X^1_r X^2_s D_t$$

wherein
α, p, q, r, s and t each independently is 0 or a number greater than 0,
$p+q+r+s=m\alpha=2$,
$0 \leq (r+s)/(\alpha+1) < 2, ] 0 < (r+s)/(\alpha+1) < 1.5$,
m is the valence of M,
M is a metal of the 1st to 3rd groups of the Periodic Table,
$R^1$ is a hydrocarbon group having 1 to 20 carbon atoms,
$R^2$ is a secondary or tertiary alkyl group having 3 to 20 carbon atoms,
$X^1$ and $X^2$ each independently is a hydrogen atom or an organic electronegative group containing O, N or S,
D is an electron donor,
with a compound (ii) of the formula, $$R^3_a CY_{4-1}$$

wherein
$R^3$ is a hydrogen atom or a hydrocarbon group having 1 to 10 carbon atoms,
Y is a halogen atom,
a is 0 or 1,
and contacting the product of (i)+(ii) with (iii) a compound of tetravalent titanium and/or a compound of pentavalent or tetravalent vanadium at a concentration of titanium plus vanadium of at most about 2 mols per liter of an inert reaction solvent, the atomic ratio of Mg/(Ti+V) in (A) being about 3 to about 500.

* * * * *

UNITED STATES PATENT AND TRADEMARK OFFICE
CERTIFICATE OF CORRECTION

PATENT NO. : 4,330,647
DATED : May 18, 1982
INVENTOR(S) : Hisaya Sakurai et al

It is certified that error appears in the above—identified patent and that said Letters Patent is hereby corrected as shown below:

Col. 5, l. 40, Delete "$CY_{4-1}$" and insert --$CY_{4-a}$--.

Col. 12, l. 61, Delete "$[0 < (r+s)/(\alpha+1) < 2,]$".

Col. 15, l. 21, Delete "$0 \leq (r+s)/(\alpha+1) < 2,]$".

Col. 16, l. 11, Delete "$CY_{4-1}$" and insert --$CY_{4-a}$--.

Signed and Sealed this

Fourteenth Day of June 1983

[SEAL]

Attest:

DONALD J. QUIGG

*Attesting Officer*   *Acting Commissioner of Patents and Trademarks*